US006567134B1

(12) United States Patent
Morgan

(10) Patent No.: US 6,567,134 B1
(45) Date of Patent: May 20, 2003

(54) SECONDARY COLOR BOOST IN SEQUENTIAL COLOR SYSTEMS

(75) Inventor: Daniel J. Morgan, Denton, TX (US)

(73) Assignee: Texas Instruments Incorporated, Dallas, TX (US)

( * ) Notice: Subject to any disclaimer, the term of this patent is extended or adjusted under 35 U.S.C. 154(b) by 474 days.

(21) Appl. No.: 09/590,473

(22) Filed: Jun. 8, 2000

Related U.S. Application Data

(60) Provisional application No. 60/138,499, filed on Jun. 8, 1999.

(51) Int. Cl.[7] .................................................. H04N 9/31
(52) U.S. Cl. ........................ 348/743; 348/750; 348/742; 348/771; 348/270
(58) Field of Search ................................ 348/771, 742, 348/743, 750, 758, 759, 70, 744, 268, 269, 270, 271; 353/31; 345/84; 359/618; 358/512; 382/162

(56) References Cited

U.S. PATENT DOCUMENTS

| | | | | |
|---|---|---|---|---|
| 5,046,162 A | * | 9/1991 | Ishikawa et al. ............. | 348/270 |
| 5,583,688 A | | 12/1996 | Hornbeck .................... | 359/291 |
| 5,654,756 A | * | 8/1997 | Takahashi et al. ........... | 348/268 |
| 5,990,982 A | * | 11/1999 | Gove et al. .................. | 348/750 |
| 6,002,452 A | * | 12/1999 | Morgan ....................... | 348/742 |
| 6,034,666 A | * | 3/2000 | Kanai et al. ................. | 345/593 |
| 6,046,782 A | * | 4/2000 | Hayakawa ................... | 348/742 |
| 6,064,366 A | * | 5/2000 | Millward et al. ............ | 345/691 |
| 6,147,720 A | * | 11/2000 | Guerinot et al. ............ | 348/744 |
| 6,256,425 B1 | * | 7/2001 | Kunzman .................... | 382/274 |
| 6,392,717 B1 | * | 5/2002 | Kunzman .................... | 348/744 |
| 6,406,148 B1 | * | 6/2002 | Marshall et al. .............. | 353/31 |

OTHER PUBLICATIONS

U.S. patent application Ser. No. 09/370,149, Morgan et al., filed Aug. 9, 1999.
U.S. patent application Ser. No. 09/572,470, Morgan, filed May 17, 2000.
U.S. patent application Ser. No. 09/573,109, Morgan, filed May 17, 2000.

* cited by examiner

Primary Examiner—John Miller
Assistant Examiner—Jean W. Désir
(74) Attorney, Agent, or Firm—Charles A. Brill; Wade James Brady, III; Frederick J. Telecky, Jr.

(57) ABSTRACT

A method and system of increasing the intensity of secondary colors in sequential color display systems. The method utilizes light during a transition period between two primary color periods to form a secondary color. The light generated during this transition is generally not used since it does not represent a pure primary color, but instead typically starts as light of a first pure primary and ends as light of a second pure primary. A display controller determines which secondary color is needed, and the amount of the secondary color needed, and enables the transition or spoke light to contribute to the image during a time period appropriate to desired secondary color intensity given the intensity and switching characteristics of the light during the transition period. For example, light (210) filtered by a color wheel (200) during the transitional period (212 to 214) between a red (102) and green (106) filter is used to increase the yellow component of the image. Several optional methods are used to minimize the artifacts created by the spoke light and to adapt the secondary color boost to white-boosting spoke light recapture methods. In general, the spoke periods are used to boost the white level of de-saturated images and to boost the secondary colors of saturated images.

23 Claims, 4 Drawing Sheets

SECONDARY COLOR BOOST IN SEQUENTIAL COLOR SYSTEMS

This application claims priority under 35 USC §119(e)(1) of provisional application No. 60/138,499 filed Jun. 8, 1999.

CROSS-REFERENCE TO RELATED APPLICATIONS

The following patents and/or commonly assigned patent applications are hereby incorporated herein by reference:

| Pat. No. | Filing Date | Issue Date | Title |
| --- | --- | --- | --- |
| 5,583,688 | Dec. 21, 1993 | Dec. 10, 1996 | Multi-Level Digital Micromirror Device |
| 09/370,419 | Aug. 9, 1999 | | Spatial-Temporal Multiplexing for High Bit-Depth Resolution Displays |
| 09/572,470 | May 17, 2000 | | Spoke Light Recapture In Sequential Color Imaging Systems |
| 09/573,109 | May 17, 2000 | | Noise-Free Boundary Dispersion For Mitigating PWM Temporal Contouring Artifacts |

FIELD OF THE INVENTION

This invention relates to the field of display systems, more particularly to display systems using sequential color techniques such as color wheels.

BACKGROUND OF THE INVENTION

Modern display systems typically create full-color projected images by projecting three single-color images. The eye of the viewer integrates these single-color images to give the perception of a single, full-color image. Three separate modulators or controllable light sources are often used simultaneously to generate the primary-color images. For example, three liquid crystal display (LCD) panels or digital micromirror device (DMD) arrays and appropriate dichroic filters create three primary-color images using a single light source, or three cathode ray tubes perform both the modulator and light source functions to create three primary-color images.

Alternatively, a single modulator is used with a sequential color light source to sequentially create three primary-color images. If the light source sequences through the primary colors fast enough, the viewer will not see the sequential single-color images but instead will see a single full-color image. A sequential color light source is formed by combining a white-light source with a filtering means such as a color wheel.

A color wheel typically is a disk-shaped assembly of dichroic filters. Other shapes of "color wheels" are possible, such as rotating drums or polygons. The white-light beam is focused on the color wheel and the dichroic filters, which are either transmissive or reflective, filter the white light to form a primary-color light beam. The color wheel includes at least one filter for each of the primary colors.

Spinning the color wheel so that each filter passes through the point at which the white light beam strikes the color wheel generates a sequential primary color light beam. The color wheel typically is spun fast enough to create at least one primary color period for each primary during each frame of a video image. Spinning the wheel faster, or using multiple filter segments for one or more of the primary colors can reduce color separation artifacts that allow the viewer to detect the sequential color nature of the display system.

While a sequential color display system typically costs less to produce than a simultaneous color display system, images created by a sequential filtered color display system are not as bright as images created by simultaneous color display systems using the same light source. This is because at any given time only a portion of the light generated by the light source is being used to form the image. For example, when using a three-color equal-segment filter wheel, each primary color is produced only $\frac{1}{3}$ of the time. Additionally, when a sequential filter such as a color wheel is used, the light during the filter transitions, typically called spoke times, will be a varying mixture of the two filters being changed in and out. This mixed-color light cannot be modulated using red, green, and blue primary color data without adversely affecting the color purity of the created image.

High image brightness is one of the major desires of customers in the projection display market. In addition to a bright image, consumers desire saturated colors—specially when displaying computer generated graphics. Because of the limited dwell time of each color, bright saturated images are difficult to produce using sequential color systems. Additionally, insertion of a white or clear segment makes colors dimmer, less bright, relative to the white areas of the displayed image. Therefore, a method and system for increasing the brightness of the secondary color components (yellow, cyan, and magenta) in a projected image is needed.

SUMMARY OF THE INVENTION

Objects and advantages will be obvious, and will in part appear hereinafter and will be accomplished by the present invention which provides a method and system for using spoke light, that is light generated during color filter transitions, to increase the brightness of the secondary colors. Some embodiments include additional filter segments that can increase the saturation of the secondary colors produced by the display. One embodiment of the claimed invention provides a method of producing secondary colors in a primary color display system. The method comprises: receiving a color data word for an image pixel; determining a secondary color value of said color data word; and enabling a spatial light modulator during a transition period for a period dependent on said secondary color value. According to one embodiment, at least one primary color value is reduced to offset partially the increased intensity of the secondary color value. Various embodiments utilize more than one transition period is optionally used to increase the secondary intensity and limit the application of the secondary color boost to pixels with low white content.

According to yet another embodiment of the disclosed invention, a display system is provided. The display system comprising a modulated sequential color light source and a controller. The controller receives a color data word corresponding to each pixel in a desired image, determines a secondary color value of the color data word, and enables the modulated sequential color light source during a transition period for a period dependent on the secondary color value. The modulated sequential color light source typically is comprised of a sequential color light source and a spatial light modulator. The spatial light modulator to receives a sequential color light beam from the sequential color light source and modulates the light beam based on image data received from the controller. The sequential color light source typically is comprised of a white light source for generating a beam of white light and a sequential color filter for temporally filtering the white light beam to create a sequential color light beam. The sequential color filter typically is a set of filters forming a rotating color wheel.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new technique has been developed that allows the modulator of a sequential color display system to operate during spoke periods to increase the intensity of secondary colors without creating noticeable artifacts. The technique provides a significant brightness increase to the secondary colors, and can be used in conjunction with the white-generating spoke light recapture methods taught by U.S. patent application Ser. No. 09/572,470 to provide a significant brightness boost. Since the brightness of the image is increase without effecting the dark or off state of the image, the contrast ratio of the image is also increased.

Prior art display systems turn the modulator off during the spoke periods to avoid degrading the color purity of the red, green, and blue primaries. This is because the light produced during the spoke periods is multi-colored and cannot be modulated with primary color intensity data without adding an unwanted and improper color component to the image. U.S. patent application Ser. No. 09/572,470 describes a method and architecture for using the spoke period light from several spoke periods to create white light that increases the intensity of unsaturated images.

The present invention uses the light from one or more of the spoke periods to create secondary color light—light that is a combination of two of the primary colors. For example, the present invention provides a method and system of using light during the red-green spoke transition to produce yellow light. Various optional aspects of the present invention provide techniques to limit the perceptual impact of the additional secondary light and to integrate the secondary color boost techniques with existing white spoke light techniques.

The term spoke period should be understood to include any period when the display system is transitioning from one light color to another and the light produced is a mixture of the two colors. For example, the period when the boundary between two color filters on a color wheel passes through the illumination path of a display is a spoke period. For the purposes of this disclosure, a spoke period is also the time it takes an electronic switchable filter to change from a first color to a second color, or the time it takes a first colored light source to turn off and a second colored light source to turn on.

Figure 1:
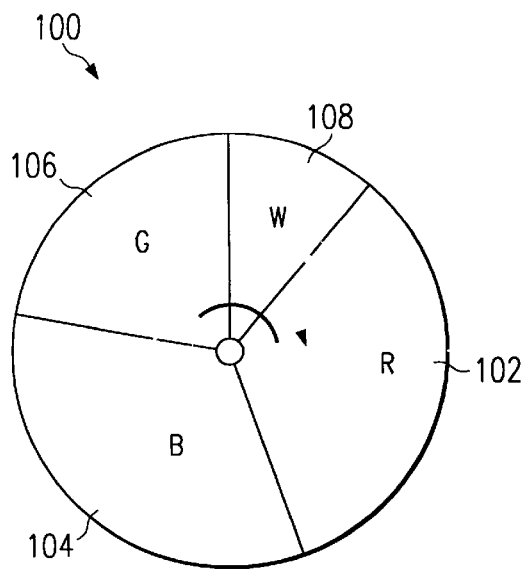
FIG. 1 is a plan view of a second embodiment of a color wheel having three primary color segments and a clear segment.

FIG. 1 is a plan view of a four-segment color wheel 100. The color wheel 100 has a red segment 102, a blue segment 104, a green segment 106, and a white segment 108. The color wheel is spun in the direction shown so that a stationary light spot—the portion of the color wheel that the white light beam strikes—passes through each segment in a complete revolution. Thus, as the wheel is turned, the light spot travels from the white segment through the green segment, through the blue segment, through the red segment, and through the white segment again. In FIG. 1, each of the three primary color segments is 105° wide while the white segment is 45° wide.

The color wheel 100 of FIG. 1 is typically spun at twice the frame rate. Spinning the color wheel 100 at twice the frame rate produces two periods in each frame in which the white light spot is completely within each filter segment. The two periods, produced one-half frame period apart, reduce the color separation artifacts that can occur with moving images or viewer eye movement.

Although a specific embodiment of a color wheel is shown in FIG. 1, it should be understood that many other embodiments are equally possible. For example, a three-segment wheel using only the three primary colors, a five segment wheel including two red segments, or many other embodiments. For simplicity, the details of the present invention will be explained with respect to the color wheel 200 of FIG. 2. Color wheel 200 includes three equal-sized primary color segments.

Radial 212 shows the point at which the white light spot 210 first reaches the green filter segment 106. Thus, when the center of the white light spot 210 crosses radial 112, the color produced by the filter wheel begins to transition from red to green. When the white light spot 210 is centered on radial 214 only green light is produced by the color wheel. Therefore, radials 212 and 214 are separated by the width of the white light spot 210 at the point the center of the white light spot 210 crosses the radials.

The time it takes for the white light spot 210 to transition across a filter spoke—from radial 212 to radial 214—is approximately 320 $\mu$S in a typical system that spins the color wheel at twice the frame rate. The transition period must be at least as long as the device load period to allow primary color data to be loaded into a modulator during the spoke period. For the purposes of this disclosure the device load period is assumed to be 200 $\mu$S and the transition or spoke period is assumed to be 320 $\mu$S.

Figure 7:
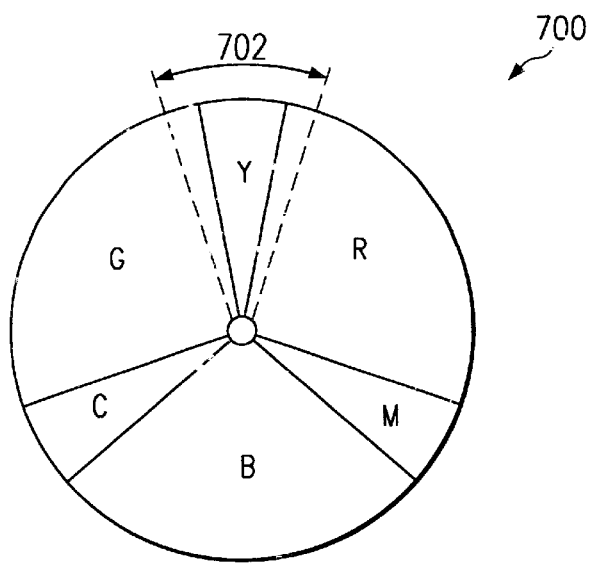
FIG. 7 is a plan view of an alternate color wheel including three primary and three secondary color segments.

Alternate color wheels increase the size of the spoke or transition periods by including a secondary segment between the primary segments. FIG. 7 is a plan view of an alternate color wheel 700 having three primary and the secondary segments. The secondary segments increase the effective size of the spoke period 702. The secondary color segments typically allows more light to pass by the color wheel to the modulator than do the primary color segments—further increasing the intensity achieved by utilizing the spoke periods to boost the secondary color intensity.

Figure 8:
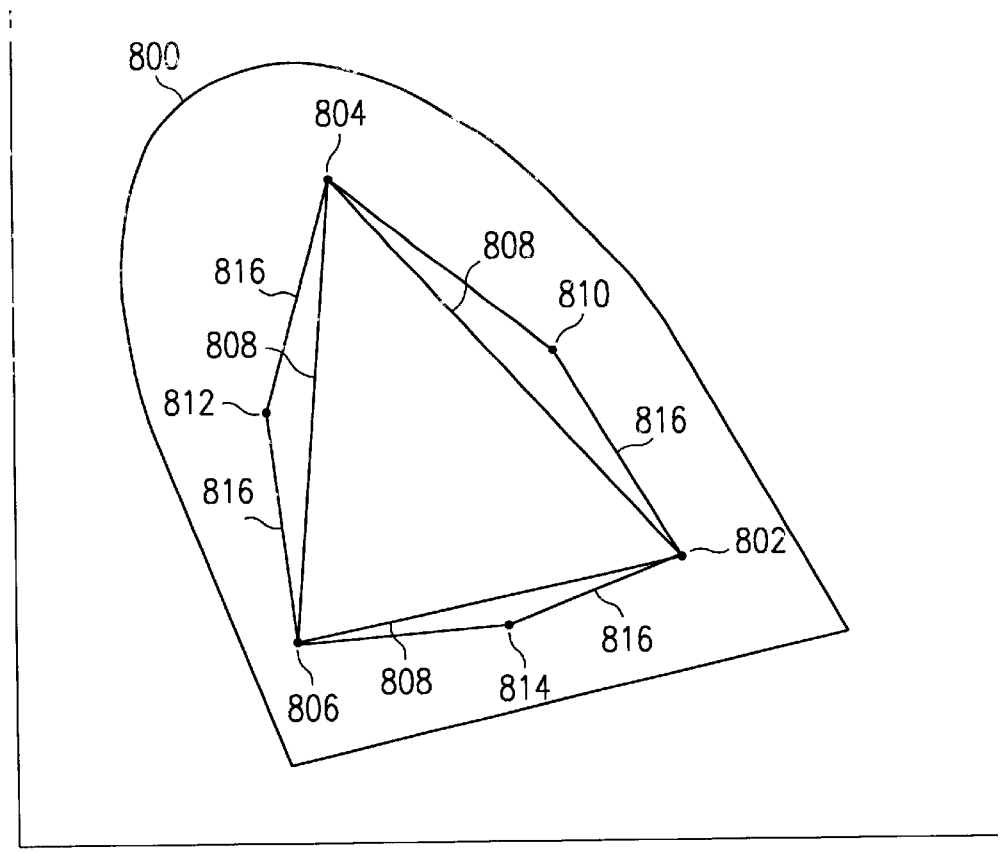
FIG. 8 is a C.I.E. chromaticity diagram showing one method of increasing color saturation using the six segment color wheel of FIG. 7.

A second use for the secondary colored filter segments is to expand the color gamut of the display system. FIG. 8 is a C.I.E. Chromaticity diagram plotting the red point 802, green point 804, and blue point 806 of a display system having three color filters. The display can reproduce saturated colors anywhere along line segments 808 connecting any of the three primaries. If the additional secondary color filters are selected to provide a yellow point 810, cyan point 812, and magenta point outside the display system three-color response 808, the secondary color segments enable the display to increase the color saturation of a projected image as shown by line segments 816.

Returning to the three segment color wheel example, since the color wheel turns two complete revolutions each frame period, there are six transition periods each frame. At a 60 Hz frame rate, the frame period is 16,667 $\mu$S and the six 320 $\mu$S transition periods consume 1,920 $\mu$S—or 11.5% of the frame period. The purpose of the novel method and apparatus discussed herein is to allow the display system to use the light generated during this portion of the frame period in order for the display system to create brighter secondary colored images without the use of a brighter light source.

Throughout this disclosure, the image and pixel intensities will be discussed, often in numerical terms. These intensity values represent the manner in which intensity values are processed in a digital display system. Each pixel of an image will be represented by an intensity value for each of the primary colors. For example, a pixel will have a red, green, and blue (RGB) intensity value. A pixel in an 8-bit display system may have RGB intensity values of (127, 127, 127) which would mean each of the primary colors was enabled at one-half of its maximum intensity.

Most display systems that use a white light source and a color wheel create single-color light beams that do not have equal intensities. For example, the green light beam created by many display systems is much more intense than the red light beam. The eye perceives colors in the natural world at different intensities. For example, 70% of the intensity (lumens) of white light comes from the green light component. Typical ratios for light that is perceived as white are 20% red, 70% green, and 10% blue. Display systems mimic this ratio by turning the display period (color wheel segment size), light source, and filter pass-band characteristics to produce natural looking whites. This disclosure will ignore methods used to compensate for unequal intensities and focus solely on the methods used to utilize the spoke light and methods used to correct the hue of images to which spoke light has been added.

One method of increasing the brightness of secondary colors in a sequential color display system is based on the realization that, while the sum of the spoke periods produces white, each individual spoke period produces a secondary color and can be used to increase the brightness of the secondary colors in an image. Thus, all of the spokes are used to boost the intensity of unsaturated images or pixels and individual spokes are used to boost the intensity of saturated secondary colored pixels.

This disclosure will use the phrase "turn on the spoke period" to refer to operating the light modulator forming a pixel during the spoke period to utilize the light generated during the spoke period. When the spoke period is turned off, light from the color wheel still passes to the light modulator, it just isn't used to contribute to the image pixel. When the spoke period is turned on, the light modulator uses the light generated during the spoke period to contribute to the pixel. Since each pixel can have a unique intensity, during a given spoke period many images will require the light modulator to use the spoke period light for some, but not all, pixels. Thus, turning a spoke or pixel on or off is only meaningful in terms of a given pixel, and this discussion should be understood to describe operation only for a single pixel or for an array of pixels having identical color intensity data.

Returning to FIG. 2, if a given element of the modulator is enabled while the color wheel rotates through the white light spot from radial 212 to radial 214, equal amounts of red and green light are provided to the corresponding pixel. This light is perceived by a viewer as a saturated yellow. Likewise, turning a modulator element on between radial 216 and 218 adds equal amounts of green and blue which is perceived as saturated cyan. Turning a modulator element on between radials 220 and 222 adds equal amounts of blue and red which is perceived as saturated magenta.

While the above examples provide a crude secondary color boost, they also add artifacts to the image being created. The artifacts are due to the large increases in secondary color intensity when the relevant spokes are turned on. As mentioned above, each spoke period is 320 $\mu$S long. If the duration of the LSB is only 20 $\mu$S, each spoke period is equivalent to 16 LSBs and the step increase in brightness is easily detected by a human viewer. Several techniques are used to reduce the step increase to below the perceptual limit of the average human viewer.

The first technique used to reduce the secondary intensity boost from the use of spoke light is to only enable one of the available spoke periods at a time. For example, if the color wheel is spun at twice the frame rate, each spoke will pass through the illumination path twice during each frame. As the need to boost the intensity of a secondary color grows, first one of the spoke periods and then the second spoke period is turned on. Likewise, a given spoke may only be turned on during alternate frames. This further reduces the contribution of the spoke to the intensity of a given pixel—but can cause flicker.

Figure 3:
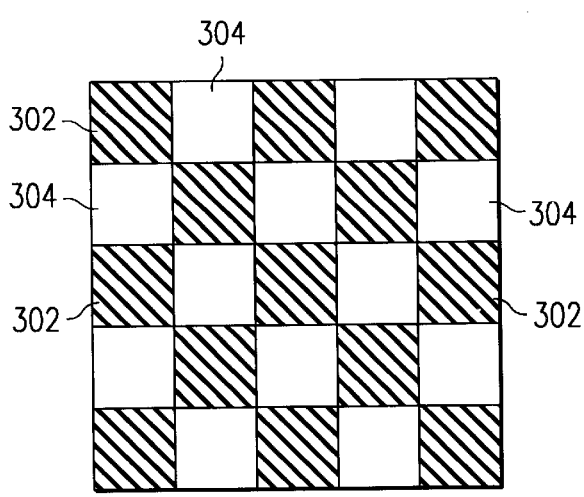
FIG. 3 is a plan view of a portion of a pixel array showing a 50% spatial multiplexing pattern.
Figure 4:
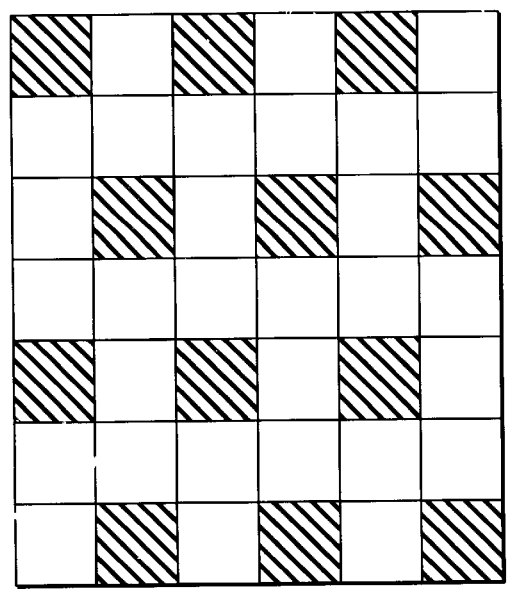
FIG. 4 is a plan view of a portion of a pixel array showing a 25% spatial multiplexing pattern.

Another technique it to spatially dither the secondary color boost pixels. FIG. 3 shows a plan view of a portion of a pixel array showing a 50% mask that is used to limit the intensity contribution from a spoke period. In FIG. 3, the spoke is enabled for half of the pixels, but not for the other half. FIG. 4 is a plan view of a portion of a pixel array showing a 25% mask that is used to limit the intensity contribution from a spoke period. In FIG. 4, each spoke is enabled for only one-fourth of the pixels. Although only examples of a 25% mask and a 50% mask are shown, any mask from 0% to 100% could be used.

While the pixel masks of FIGS. 3 and 4 reduce the contribution of each spoke period, they can introduce spatial artifacts into the image. One method of reducing the induced artifacts it to change the mask pattern each frame, typically by shifting it to another position. In the case of the 50% mask, one spoke period is used with alternate masks—every other revolution of the color wheel for a double-speed color wheel. Alternatively, using two spoke bits, one spoke can be used for pixels 302 during a first rotation of the color wheel and then for pixels 304 during a second rotation of the color wheel. Any combination of masks, spokes, and revolutions can be used to adjust the contribution of the spoke period and to break up artifacts created by using the spokes.

One of the main methods of reducing artifacts generated by the addition of a large spoke period is a corresponding reduction in the intensity of the primary colors making up the secondary light. The intensity data used to generate the component primaries is decreased by an amount one least-significant-bit (LSB) less than the amount of secondary colored light added by the spoke so that there will be the desired one LSB increase in the secondary colored light produced when the spoke is turned on. For example, if a single spoke period increased the secondary color intensity by 16 LSBs, the primary color data used to create the secondary color is reduced by a total of 15 LSBs. The primary color data is then gradually added until the next secondary spoke is added.

A final technique that is used to reduce detection of the image artifacts created by the spoke bits is to limit the use of the spoke bits to relatively bright images. The ability of the human eye to perceive a fixed chromaticity or intensity error diminishes as the image containing the error grows brighter. Thus, while limiting the use of spoke period light to bright images does not reduce the magnitude of either the chromaticity or intensity errors, it ensures the errors occur when the human eye is least likely to detect them.

Table 1 shows a sequence by which spoke periods are added to boost the yellow color component while the red and green primary data is manipulated to result in a gradual intensity increase. As explained below, YMCBUS in Table 1 indicates an amount of the secondary color to be added by a spoke period. Other signals that are not shown in Table 1 indicate which, if any, of the secondary colors are to be boosted. Only one of the secondary colors is boosted for any one pixel since boosting two or more would add a white component to the pixel and de-saturate the pixel. Adding more than one spoke color to boost the white component is described in U.S. patent application Ser. No. 09/572,470.

The first incremental boost to the Yellow component shown in Table 1 is provided by enabling the first spoke (S(0)), which separates red and green, on the first revolution of the color wheel each frame (RG1) using a 50% pattern to reduce the contribution of the spoke period (0.5). The 50% spatial mask pattern is alternated each frame. Alternatively, no mask pattern is used and the spoke period is only utilized during alternate frame periods. An appropriate amount is subtracted from the red and green primary intensity words to limit the increase as described above. The amount subtracted from the primary color intensity words depends on the size of the primary color filters, the pass band of the primary color filters, and the spectrum of the lamp used by the display system.

As the yellow component continues to increase, less and less is subtracted from the red and green primary intensities until, at YMCBUS=6, nothing is subtracted. To further increase the yellow spoke boost, the spoke is turned on for all of the pixels (no 50% mask pattern) during the first revolution of every frame period and the offsets are reapplied. As more and more yellow is desired, the offsets are reduced and the entire sequence eventually repeated for the red-green spoke during the second revolution each frame period (RG2).

TABLE 1

Yellow Spoke Boost Sequence

| YMCBUS | S(0) RG1 | S(3) BR1 | S(4) RG2 | S(7) BR2 | R | G | B |
|---|---|---|---|---|---|---|---|
| 0 | 0.5 | 0.0 | 0.0 | 0.0 | −3 | −4 | 0 |
| 1 | 0.5 | 0.0 | 0.0 | 0.0 | −3 | −4 | 0 |
| 2 | 0.5 | 0.0 | 0.0 | 0.0 | −2 | −3 | 0 |
| 3 | 0.5 | 0.0 | 0.0 | 0.0 | −2 | −2 | 0 |
| 4 | 0.5 | 0.0 | 0.0 | 0.0 | −1 | −1 | 0 |
| 5 | 0.5 | 0.0 | 0.0 | 0.0 | −1 | −1 | 0 |
| 6 | 0.5 | 0.0 | 0.0 | 0.0 | 0 | 0 | 0 |
| 7 | 1.0 | 0.0 | 0.0 | 0.0 | −3 | −4 | 0 |
| 8 | 1.0 | 0.0 | 0.0 | 0.0 | −3 | −4 | 0 |
| 9 | 1.0 | 0.0 | 0.0 | 0.0 | −2 | −3 | 0 |
| 10 | 1.0 | 0.0 | 0.0 | 0.0 | −2 | −2 | 0 |
| 11 | 1.0 | 0.0 | 0.0 | 0.0 | −1 | −1 | 0 |
| 12 | 1.0 | 0.0 | 0.0 | 0.0 | −1 | −1 | 0 |
| 13 | 1.0 | 0.0 | 0.0 | 0.0 | 0 | 0 | 0 |
| 14 | 1.0 | 0.0 | 0.5 | 0.0 | −3 | −4 | 0 |
| 15 | 1.0 | 0.0 | 0.5 | 0.0 | −3 | −4 | 0 |
| 16 | 1.0 | 0.0 | 0.5 | 0.0 | −2 | −3 | 0 |
| 17 | 1.0 | 0.0 | 0.5 | 0.0 | −2 | −2 | 0 |
| 18 | 1.0 | 0.0 | 0.5 | 0.0 | −1 | −1 | 0 |
| 19 | 1.0 | 0.0 | 0.5 | 0.0 | −1 | −1 | 0 |
| 20 | 1.0 | 0.0 | 0.5 | 0.0 | 0 | 0 | 0 |
| 21 | 1.0 | 0.0 | 1.0 | 0.0 | −3 | −4 | 0 |
| 22 | 1.0 | 0.0 | 1.0 | 0.0 | −3 | −4 | 0 |
| 23 | 1.0 | 0.0 | 1.0 | 0.0 | −2 | −3 | 0 |
| 24 | 1.0 | 0.0 | 1.0 | 0.0 | −2 | −2 | 0 |
| 25 | 1.0 | 0.0 | 1.0 | 0.0 | −1 | −1 | 0 |
| 26 | 1.0 | 0.0 | 1.0 | 0.0 | −1 | −1 | 0 |
| 27 | 1.0 | 0.0 | 1.0 | 0.0 | 0 | 0 | 0 |

Table 2 shows a similar sequence for gradually adding magenta to an image using the blue-red spokes. Tables 1 and 2 do not show any values for the remaining spokes: GW1 (S(1)), WB1 (S(2)), GW2 (S(5)), and WB2 (S(6)), since the system described uses a white or clear the use of these spokes would de-saturate the created image. Thus, the four segment color wheel system described (RGWB) does not boost the intensity of the cyan secondary component.

TABLE 2

Magenta Spoke Boost Sequence

| YMCBUS | S(0) RG1 | S(3) BR1 | S(4) RG2 | S(7) BR2 | R | G | B |
|---|---|---|---|---|---|---|---|
| 0 | 0.0 | 0.5 | 0.0 | 0.0 | −3 | 0 | −5 |
| 1 | 0.0 | 0.5 | 0.0 | 0.0 | −3 | 0 | −5 |
| 2 | 0.0 | 0.5 | 0.0 | 0.0 | −2 | 0 | −4 |
| 3 | 0.0 | 0.5 | 0.0 | 0.0 | −2 | 0 | −3 |
| 4 | 0.0 | 0.5 | 0.0 | 0.0 | −1 | 0 | −2 |
| 5 | 0.0 | 0.5 | 0.0 | 0.0 | −1 | 0 | −1 |
| 6 | 0.0 | 0.5 | 0.0 | 0.0 | 0 | 0 | 0 |
| 7 | 0.0 | 1.0 | 0.0 | 0.0 | −3 | 0 | −5 |
| 8 | 0.0 | 1.0 | 0.0 | 0.0 | −3 | 0 | −5 |
| 9 | 0.0 | 1.0 | 0.0 | 0.0 | −2 | 0 | −4 |
| 10 | 0.0 | 1.0 | 0.0 | 0.0 | −2 | 0 | −3 |
| 11 | 0.0 | 1.0 | 0.0 | 0.0 | −1 | 0 | −2 |
| 12 | 0.0 | 1.0 | 0.0 | 0.0 | −1 | 0 | −1 |
| 13 | 0.0 | 1.0 | 0.0 | 0.0 | 0 | 0 | 0 |
| 14 | 0.0 | 1.0 | 0.0 | 0.5 | −3 | 0 | −5 |
| 15 | 0.0 | 1.0 | 0.0 | 0.5 | −3 | 0 | −5 |
| 16 | 0.0 | 1.0 | 0.0 | 0.5 | −2 | 0 | −4 |
| 17 | 0.0 | 1.0 | 0.0 | 0.5 | −2 | 0 | −3 |
| 18 | 0.0 | 1.0 | 0.0 | 0.5 | −1 | 0 | −2 |
| 19 | 0.0 | 1.0 | 0.0 | 0.5 | −1 | 0 | −1 |
| 20 | 0.0 | 1.0 | 0.0 | 0.5 | 0 | 0 | 0 |
| 21 | 0.0 | 1.0 | 0.0 | 1.0 | −3 | 0 | −5 |
| 22 | 0.0 | 1.0 | 0.0 | 1.0 | −3 | 0 | −5 |
| 23 | 0.0 | 1.0 | 0.0 | 1.0 | −2 | 0 | −4 |
| 24 | 0.0 | 1.0 | 0.0 | 1.0 | −2 | 0 | −3 |

TABLE 2-continued

Magenta Spoke Boost Sequence

| YMCBUS | S(0) RG1 | S(3) BR1 | S(4) RG2 | S(7) BR2 | R | G | B |
|---|---|---|---|---|---|---|---|
| 25 | 0.0 | 1.0 | 0.0 | 1.0 | −1 | 0 | −2 |
| 26 | 0.0 | 1.0 | 0.0 | 1.0 | −1 | 0 | −1 |
| 27 | 0.0 | 1.0 | 0.0 | 1.0 | 0 | 0 | 0 |

The amount of secondary color boost that is added by using the spoke periods is determined by the white content and the intensity of the pixel. One possible equation is:

|  | YCMBUS | =min(P1, P2)-(P1P2Gain * \|P1 − P2\|)-(P3GAIN * P3)-Soff |
|---|---|---|
| where: | YCMBUS | =Amount of secondary color boosted |
|  | P1 | =First primary to be used |
|  | P2 | =Second primary to be used |
|  | P3 | =Third primary to be used |
|  | P1P2Gain | =Gain applied to the secondary (typically 0.5, 1.0, or 2.0) |
|  | P3Gain | =Gain applied to the third primary (typically 0.5, 1.0, or 2.0) |
|  | Soff | =Secondary offset |

YCMBUS is calculated for each arrangement of the three primary color components. The assignment of the primaries to P1, P2, and P3 is chosen to result in a non-zero YCMBUS if possible—the primary with the largest intensity value is assigned to P1, the second largest to P2, and the smallest, which also indicates the white level, to P3. The secondary offset, often set equal to 192 for an 8-bit data word size, is selected to prevent the secondary color boost circuit from enabling a spoke period until a fairly bright image pixel is required. As mentioned above this minimizes the ability of a human viewer to detect any artifacts created by the use of the spoke periods. The value of P3Gain is selected to ensure the secondary color boost circuit is not active at the same time the spoke light recapture circuit is boosting the white level.

Figure 2:
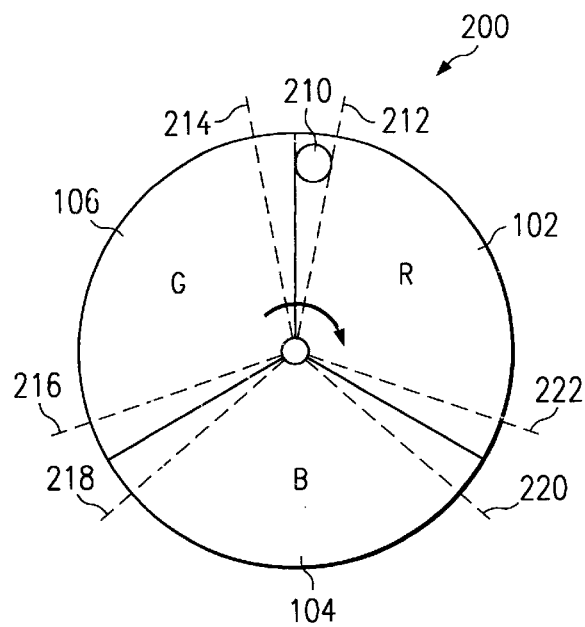
FIG. 2 is a plan view of one embodiment of a color wheel having three primary color segments.
Figure 5:
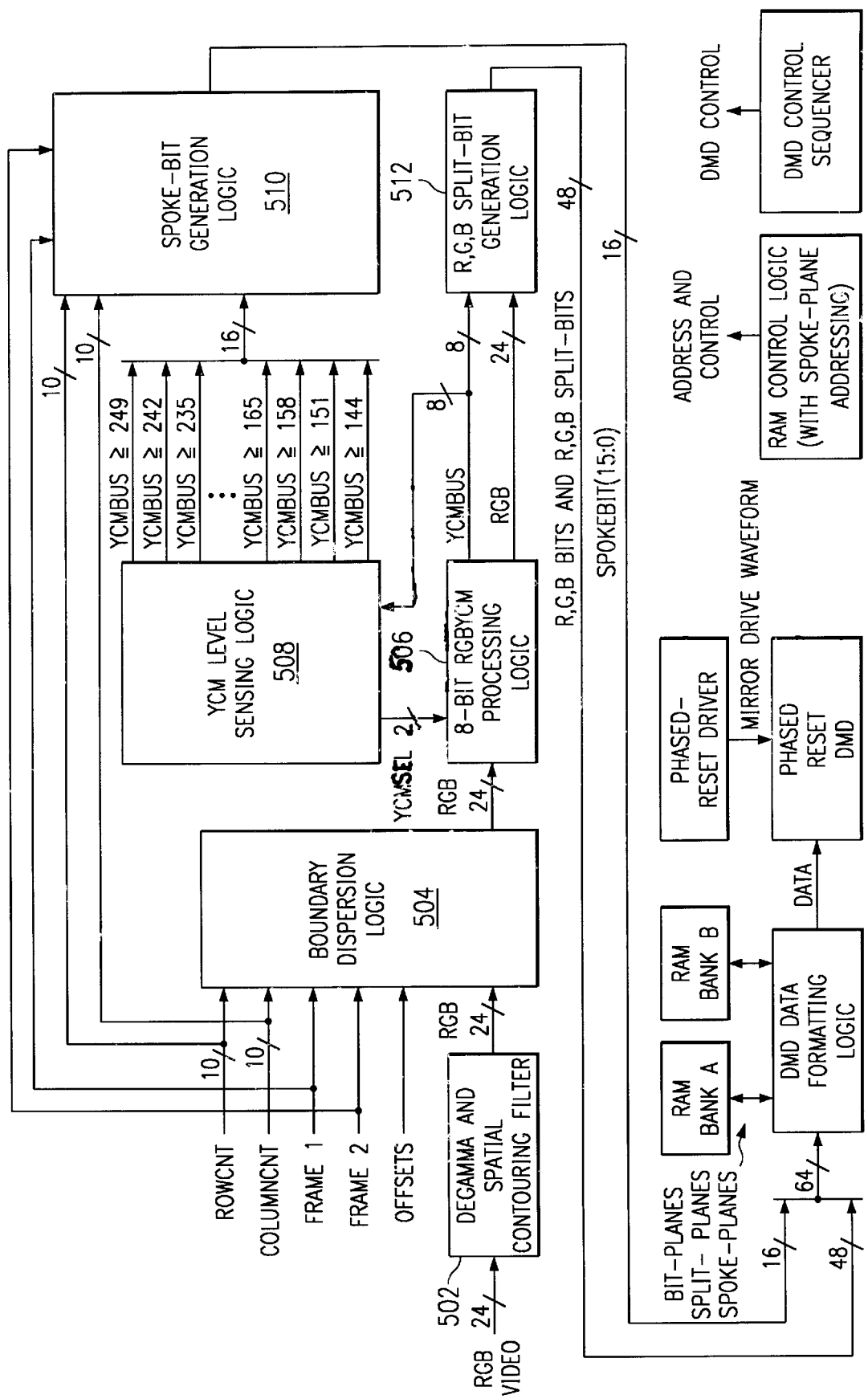
FIG. 5 is a schematic view of the image processing logic used in one embodiment of the present invention.

FIG. 5 shows an embodiment of the secondary boost for a DMD-based display system. A three segment RGB color wheel similar to the one shown in FIG. 2 is used to sequentially pass red, green, and blue light to the DMD.

The data processing portion of FIG. 5 starts with pixels from the RGB source. A degamma function 502 is applied so that the DMD display output matches a CRT response. Since the degamma output is limited to 24 bits, a spatial contouring filter is included to diffuse the 8-bit per color quantization errors that otherwise would be detectable for low intensity pixels.

The 24-bit RGB output from the spatial contouring filter is the input to the boundary dispersion block 504. Boundary dispersion helps reduce any boundary artifacts created when pixel codes cross specific boundaries—generally boundaries at which an MSB is enabled. These boundaries include boundaries that create PWM temporal contouring artifacts and slight linearity or chrominance boundaries due to turning on spoke-bit-groups.

The 24-bit boundary dispersion output is the input to the 8-bit RGBYCM processing logic 506. This block outputs 24-bit RGB data and 8-bit YCM data. The logic implements the equation in FIG. 3A; this equation is computed for each secondary color. A 2-bit YCMSEL bus is also output to indicate which of the secondary colors is to be boosted.

YCMSEL's value is set by whichever FIG. 3A equation (Y,C,M) yields a non-zero result. The 24 bits of RGB data are then input to the split-bit generation logic block where split-bits are applied to further mitigate PWM temporal contouring artifacts for R, G, and B.

The 8-bit YCMBUS is input to the YCM level sensing logic 508. The secondary color on this bus is indicated by YCMSEL. This block outputs 16 level detection signals. Other embodiments use more or less than 16 level detection signals. These signals are input to the spoke-bit generation logic 510. The spoke-bit generation logic 510 outputs the spoke-bits according to the spatial multiplexing of spoke-bit-groups. A 50% checkerboard (FIG. 3) or 25% pattern (FIG. 4) is used for single spoke bits. The patterns can also be applied to more than one bit. For example, RG1 could use a 50% pattern and RG2 a 50% pattern, but with the opposite spatial phase. The ROWCNT and COLUMNCNT busses are also inputs to the spoke-bit generation logic. They are used to indicate the spatial location of each pixel so that the spoke bit generation logic can set the appropriate spoke bits high when a particular level indicator signal is active from the YCM level sensing logic. The FRAME1 and FRAME2 signals indicate odd versus even frames in case some temporal multiplexing of the spatial patterns is desired—for example toggling of the checkerboard pattern.

As indicated by Table 1, when a spoke-bit-group is activated by the spoke-bit-generation logic 510 an intensity step of 7 LSBs is taken (referenced to the red and green channels). No more than a two LSB step, one due to the normal red and green channels and the other due to the secondary boost, is typically acceptable. To solve this, the RGBYCM logic subtracts 6 LSBs from the red and green channels prior to outputting data to the RGB split-bit generation logic 512. The subtraction operation is detailed in Tables 1 and 2 above.

The purpose of the RGB split-bit logic is to create split-bits for red, green, and blue that control the bit-splits for these colors. Since not all bits have bit-splits, some of the 48 outputs will simply be normal pixel data bits. All data bits require some processing in the RGB split-bit logic to account for the non-binary nature of the split-bits.

The spoke-bit generation logic outputs 16 spoke bits and the RGB split-bit logic outputs 48 signals. The 64 combined bits are input to the DMD formatting logic. The DMD data formatting logic puts the data into digital plane format. Sixty-four digital planes are used. The 64 planes are comprised of bit-planes, split-planes, and spoke-planes. Data is written to one bank of RAM while the other is being continuously read from and the date written to the DMD. Thus, a double-buffer memory is used. The buffers are swapped at each VSYNC which indicates a frame boundary for source pixels.

A DMD waveform for moving the mirrors into the binary states indicated by the RGB and spoke bit data is generated by the DMD phased reset driver. A DMD control sequencer is used to load digital planes into the DMD and to assign mirror on-time weights as needed for loading bit-planes, split-planes, and spoke-planes. The sequencer also controls the time placement of the phased-reset waveform for each DMD reset group.

Figure 6:
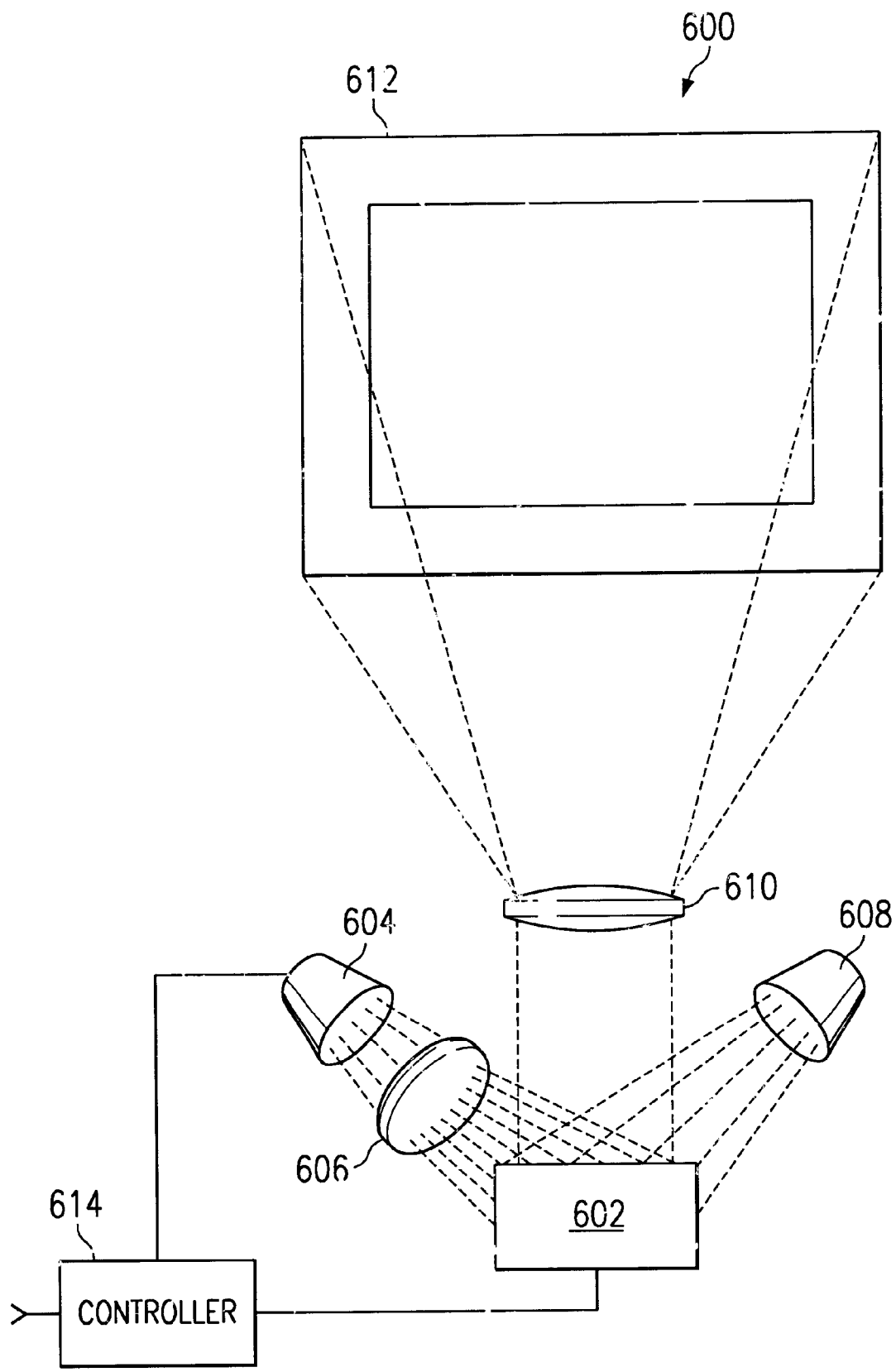
FIG. 6 is a schematic view of a micromirror-based projection system utilizing an improved micromirror device according to one embodiment of the present invention.

FIG. 6 is a schematic view of an image projection system 600 using an improved micromirror 602 according to the present invention. In FIG. 6, light from light source 604 is focused on the improved micromirror 602 by lens 606. Although shown as a single lens, lens 606 is typically a group of lenses and mirrors which together focus and direct light from the light source 604 onto the surface of the micromirror device 602. Image data and control signals from controller 614 cause some mirrors to rotate to an on position and others to rotate to an off position. Mirrors on the micromirror device that are rotated to an off position reflect light to a light trap 608 while mirrors rotated to an on position reflect light to projection lens 610, which is shown as a single lens for simplicity. Projection lens 610 focuses the light modulated by the micromirror device 602 onto an image plane or screen 612.

Thus, although there has been disclosed to this point a particular embodiment for a secondary boost system and method thereof, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A method of producing secondary colors in a primary color display system, the method comprising:
   receiving a color data word for an image pixel;
   determining a secondary color value of said color data word; and
   enabling a spatial light modulator during a transition period for a period dependent on said secondary color value.

2. The method of claim 1, further comprising the step of:
   reducing at least one primary color value to offset partially said period dependent on said secondary color value.

3. The method of claim 1, further comprising the step of:
   determining a second secondary color value of said color data word; and
   enabling a spatial light modulator during a transition period for a period dependent on said second secondary color value.

4. The method of claim 1, further comprising the step of:
   reducing at least one primary color value to offset partially said period dependent on said second secondary color value.

5. The method of claim 1, said enabling step comprising:
   enabling said spatial light modulator during sequential transition periods for at least two periods, a sum of said at least two periods dependent on said secondary color value.

6. The method of claim 1, said step of determining a secondary color value of said color data word further comprising the steps of:
   determining a white component of said color data word;
   setting said secondary color value equal to zero when said white component exceeds a pre-determined threshold.

7. The method of claim 1, said step of determining a secondary color value of said color data word further comprising the steps of:
   determining a white component of said color data word;
   scaling said secondary color value based on said white component.

8. The method of claim 1, said step of determining a secondary color value of said color data word further comprising the steps of:
   determining a primary color component of said color data word;
   scaling said secondary color value based on said primary component.

9. The method of claim 1, said step of receiving a color data word for an image pixel comprising the step of:
   receiving three primary color data words for said image pixel, each primary color data word representing the intensity of a corresponding primary color component of said image pixel.

10. The method of claim 1, said enabling step further comprising the step of:
    applying a mask pattern to said spatial light modulator during said transition period.

11. The method of claim 10, wherein said mask pattern has a 25% density pattern.

12. The method of claim 10, wherein said mask pattern has a 50% density pattern.

13. The method of claim 10, wherein said mask pattern is temporally dithered.

14. The method of claim 10, wherein said mask pattern is temporally dithered from frame to frame.

15. The method of claim 10, wherein said mask pattern is temporally dithered from one revolution of a color wheel to the next revolution of said color wheel.

16. A display system comprising:
    a modulated sequential color light source; and
    a controller, said controller for receiving a color data word corresponding to each pixel in a desired image, determining a secondary color value of said color data word, and enabling said modulated sequential color light source during a transition period for a period dependent on said secondary color value.

17. The display system of claim 16, said modulated sequential color light source comprised of:
    a sequential color light source; and
    a spatial light modulator to receive a sequential color light beam from said sequential color light source and to modulate said light beam based on image data received from said controller.

18. The display system of claim 16, said modulated sequential color light source comprised of:
    a white light source for generating a beam of white light;
    a sequential color filter for temporally filtering said white light beam to create a sequential color light beam; and
    a spatial light modulator to receive said sequential color light beam and to modulate said light beam based on image data received from said controller.

19. The display system of claim 18, said sequential color filter comprised of at least two color filters forming a rotating color wheel.

20. The display system of claim 18, said sequential color filter comprised of at least six color filters, three primary color filters and three secondary color filters disposed between said primary color filters.

21. The display system of claim 18, said sequential color filter comprised of at least two primary color filters having a secondary color filter disposed therebetween.

22. The display system of claim 21, said secondary color filter expanding the color gamut of images produced by said primary color filters.

23. The display system of claim 18, said sequential color filter comprised of at least two color filters forming a rotating color drum.

* * * * *